United States Patent [19]

Kaspar et al.

[11] Patent Number: 4,832,700
[45] Date of Patent: May 23, 1989

[54] PROCESS AND APPARATUS FOR PREPARING DUST-FREE GRANULAR MATERIAL

[75] Inventors: Jan Kaspar, Birsfelden; Pierre Schmid, Riehen, both of Switzerland

[73] Assignee: Sandoz Ltd., Basel, Switzerland

[21] Appl. No.: 628,806

[22] Filed: Jul. 9, 1984

Related U.S. Application Data

[63] Continuation of Ser. No. 456,347, Jan. 7, 1983, abandoned.

[30] Foreign Application Priority Data

Jan. 9, 1982 [DE] Fed. Rep. of Germany ....... 3200456

[51] Int. Cl.$^4$ .............................................. C22B 1/14
[52] U.S. Cl. ............................. 23/313 FB; 34/57 A; 209/138; 209/139.1; 209/140; 209/141; 264/117; 422/143; 422/145
[58] Field of Search .................. 23/313 FB; 34/57 A; 209/138–141; 264/117; 422/143, 145

[56] References Cited

U.S. PATENT DOCUMENTS

| | | | |
|---|---|---|---|
| 2,729,330 | 1/1956 | Newirth | 209/138 |
| 2,949,245 | 8/1960 | Faulk | 209/139.1 X |
| 3,376,124 | 4/1968 | Hollingsworth | 71/39 |
| 3,391,003 | 7/1968 | Armstrong et al. | 23/313 FB X |
| 3,738,821 | 6/1973 | Barber | 23/313 FB X |
| 3,748,103 | 7/1973 | Bean et al. | 23/313 |
| 3,880,968 | 4/1975 | Kaspar et al. | 264/37 |
| 3,884,645 | 5/1975 | Kinne | 23/313 FB X |
| 3,950,265 | 4/1976 | Albrecht et al. | 71/107 X |
| 3,969,546 | 7/1976 | Saeman | 23/313 FB X |
| 4,008,053 | 2/1977 | Brenneman et al. | 44/1 D |

FOREIGN PATENT DOCUMENTS

| | | | |
|---|---|---|---|
| 295787 | 2/1966 | Australia | 23/313 FB |
| 1381480 | 1/1975 | United Kingdom | |
| 1449283 | 9/1976 | United Kingdom | |

Primary Examiner—Barry S. Richman
Assistant Examiner—Michael S. Gzybowski
Attorney, Agent, or Firm—Gerald D. Sharkin; Richard E. Vila; Thomas C. Doyle

[57] ABSTRACT

A fluidized bed apparatus comprises a chamber having a perforated floor, a spray nozzle located in the chamber above the perforated floor, whereby material to be granulated is introduced into the chamber in the form of a solution or dispersion, means for passing heated gas upward through said perforated floor, whereby solid particles of said material are formed in said chamber, particle size-reducing means outside of said chamber, whereby particles larger than a first predetermined size are reduced in size, a screw shaft located above said perforated floor and communicating with said size-reducing means, whereby particles are withdrawn from said chamber and conveyed to said size-reducing means, a pipe having one end located downstream of said size-reducing means and its other end communicating with said chamber, and means for generating a flow of air whereby particles smaller than a second predetermined size exiting from said size-reducing means are returned through said pipe to said chamber.

19 Claims, 3 Drawing Sheets

PROCESS AND APPARATUS FOR PREPARING DUST-FREE GRANULAR MATERIAL

This application is a continuation-in-part of co-pending application Ser. No. 456,347 filed Jan. 7, 1983 and now abandoned.

Products in granular form (for example dyestuffs or chemicals) may be prepared from solutions of the material in apparatuses such as atomisers, paddle driers or belt driers. The products may be in substantially pure form (for example chemicals such as benzotriazole with only a small amount of side product) or may have a substantial amount of additive present (e.g. 10–70% by weight). Dyestuffs for instance will often contain coupage material so that it is possible to reproduce a particular strength of colour (with reference to a control value). Further inert material (such as NaCl or Glauber Salt) which may be left over from the preparation of the dyestuff may also be present in the final product.

Commercial dyestuffs must generally have a variety of good properties when in granular form, for example good solubility (preferably in water), good rate of solution, minimal or no dust, good wetting properties and good pourability. It is often difficult to obtain improvement in all these properties because where one property is improved, another will tend to be worsened. For example a particle with a hard surface will generally produce no or little dust but will be difficult to dissolve.

In order to reduce the amount of dust present in a mass of fluidised particles and to achieve a more uniform size of particle the invention provides a process for preparing a granular product having particles substantially within a given size range comprising introducing the product in the form of a spray of a solution or dispersion to a fluidised bed drier, removing particles formed in the fluidised bed from the fluidised bed, reducing the size of particles larger than a first predetermined size (hereinafter referred to as larger particles) and then recycling only particles of less than a second predetermined size (hereinafter referred to as smaller particles) the first predetermined size being greater than the second predetermined size. It is of course appreciated that a statistically insignificant amount of particles of size larger than that of smaller particles may also be recycled with the smaller particles.

Preferably the smaller particles are recycled by contacting the falling mass of particles with air flowing countercurrent to the fall of particles of such a force to cause the smaller particles to move in a direction opposite to their fall returning these particles by means of a pipe to the fluidized bed drier.

Preferably the larger particles are reduced in size by being milled through a rasp, that is to say that a milling piece forces the particles through elongated holes (of approximately the first predetermined size) of the rasp. Preferably the smaller particles are returned to the fluidised bed via a pipe, positioned downstream of the rasp and positioned so that the smaller particles, after passing through the rasp and being contacted by air flowing countercurrent to the fall of particles (and being of sufficient pressure to blow the smaller particles in a direction opposite to their fall) are blown into the pipe. More preferably the particles contact one or more perforated baffles to facilitate separation of the smaller particles falling from the rasp prior to the smaller particles entering the pipe for recycling.

Preferably in the process according to the invention following the reducing in size and recycling steps the particles are wetted by contacting the particles in a further fluidised bed with a wetting material. Examples of suitable wetting material are sulphonated castor oil and the sodium salt of dinaphthyl methane disulphonic acid in aqueous solution.

Preferably the process according to the invention is a continuous fluidisation process where material to be fluidised is continuously introduced into the fluidised bed and the granular product is removed from the bed, the larger particles are reduced, the smaller particles (as herein defined) are recycled and the granular product is removed from the apparatus.

In the preferred continuous process according to the invention at least 90 kg of granulate can be produced per $m^2$ of floor of the fluidised bed per hour.

Preferably when the granular product is wetted the product resulting contains 0.5 to 10% more preferably 1 to 2% of the wetting material (such as given above). An advantage of damping the material is that the dust is lessened and the storage and transport stability is increased without affecting the water solubility of the material.

Further, according to the invention there is provided a fluidised bed apparatus comprising a container having a perforated floor, a spray nozzle located in the container above the perforated floor, means for passing heated gas upward through the perforated floor, means for withdrawing solid particles from the space above the perforated floor and bringing them to means for reducing the size of particles larger than a first predetermined size (hereinafter referred to as the larger particles) and to dust removing means for returning particles of a size less than a second predetermined size (hereinafter referred to as the smaller particles) to the fluidised bed via a pipe.

Preferably the means for withdrawing particles is located close to the perforated floor.

Preferably the means for reducing the larger particles comprises a rasp and a milling piece, the milling piece being so positioned that the particles are forced through holes in the rasp by the pressing action of the milling piece.

Preferably the dust removing means comprises a pipe connected at one end to that part of chamber 1 defining the fluidised bed and the other end being located downstream of the means for reducing the larger particles, an inlet for the introduction of air, located downstream of the means for reducing the larger particles and one or more perforated baffles, the dust removing means functioning in that particles, from the means for reducing the larger particles, fall on to the baffle or baffles and are contacted by air from the inlet, flowing in countercurrent to the fall of particles, of such a force that particles of less than the second predetermined size are blown into the pipe connected to the fluidised bed.

Preferably the rasp has elongated holes.

Preferably the granular material formed by a process or an apparatus according to the invention has particles on average 0.2 to 1 mm, more preferably 0.6 to 0.7 mm in size.

Preferably in the apparatus according to the invention means for evenly wetting the fluidised material is provided, said means being located downstream of the means for reducing larger particles and the dust removing means, the wetting means comprising a perforated floor, means for introducing fluidising air through the floor and a nozzle for introducing wetting material (such as given above) in the form of a spray, the wetting means operating in that the particles fall on the perforated floor and are sprayed with wetting material from the nozzle in a region above the floor whilst at the same time fluidising the particles with air.

The granular products prepared according to a process of the invention or by an apparatus of the invention have good easy handling properties. Good easy handling properties are minimal dust present, good pourability, good wetability, good solubility or dispersability (preferably in water), good dissolving rate, good storage and good transportability.

The invention will now be illustrated with reference to the accompanying drawings in which FIG. 1 is a cross sectional view of a fluidised bed apparatus according to the invention;

Figure 1:
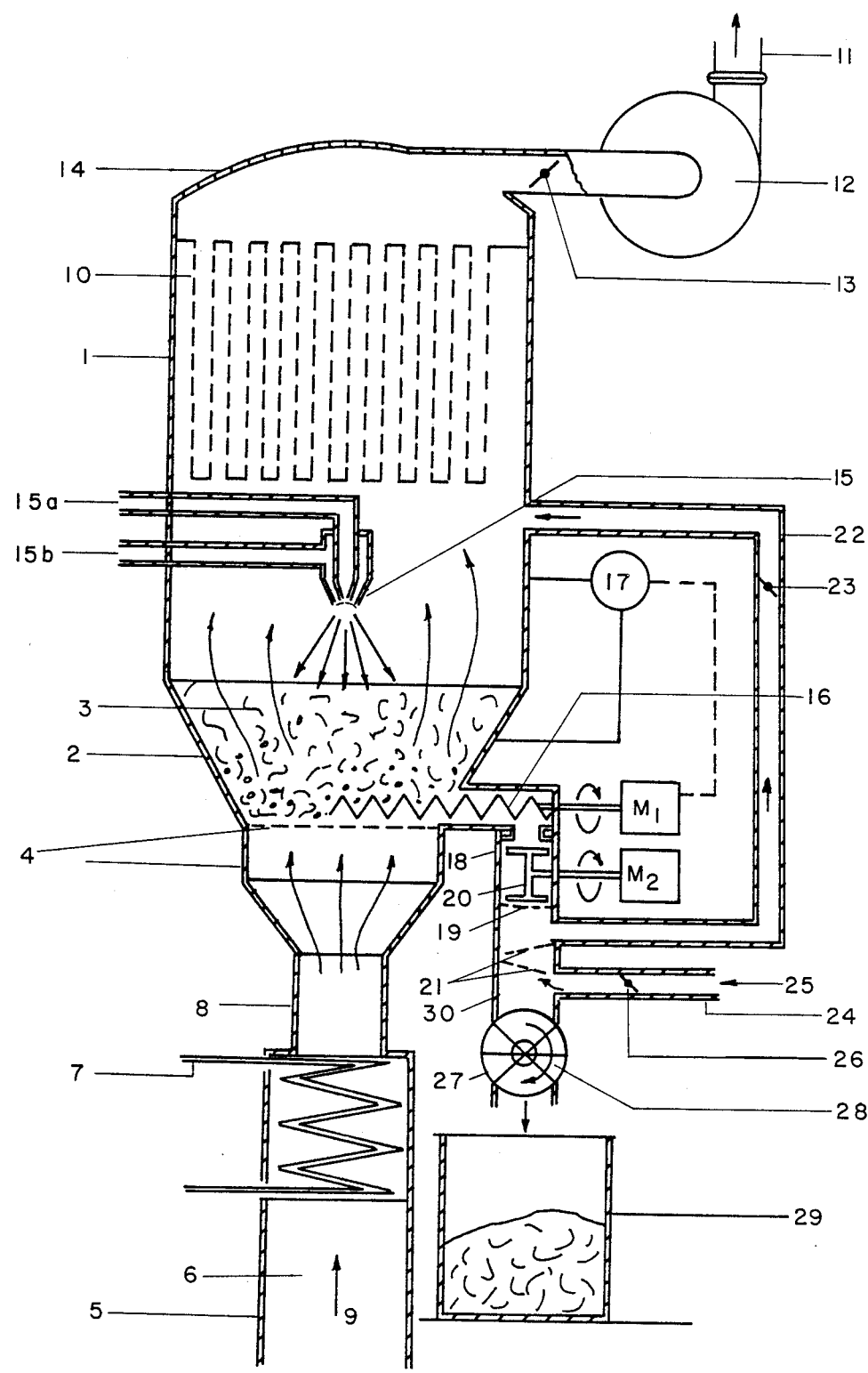

FIG. 1 shows a fluidised bed apparatus comprising a chamber 1 which, when in operation, has in a lower region a funnel portion 2 containing a fluidised bed 3 at the bottom of which is a perforated floor 4. Funnel portion 2 is connected to means 5 for introducing fluidising air to the bed 3, means 5 comprising an inlet pipe 6, a heater 7 and a connecting pipe 8. The direction of the flow of fluidising air 9 is shown in inlet pipe 6.

Towards the top of chamber 1 a filter 10 is located to prevent small particles from the fluidised bed 3 being transmitted out of the apparatus. Filter 10 communicates with an outlet pipe 11 which allows the fluidising air to pass out of the apparatus. The flow of fluidising air from the apparatus is controlled by a fan 12 and a vent 13. The top of chamber 1 has a cover 14.

A spray nozzle 15 is located between filter 10 and the fluidised bed 3, the nozzle 15 being for introducing material to be fluidised to the fluidised bed 3 in the form of a spray. Inlet 15a introduces the material to be fluidised in liquid form (for example as a dispersion or suspension) to nozzle 15 and inlet pipe 15b introduces air to nozzle 15 so that a fine spray of material to be fluidised is produced. Arrows show the direction of flow of the spray.

Above perforated floor 4 a screw shaft 16 is located for removing fluidised material from the fluidised bed 3. The material is moved along the axis of the shaft 16 by rotation of said shaft 16 (as shown by the arrow) in response to motor $M_1$ which is controlled by a pressure operated valve 17 which measures the difference in pressure between the region of the nozzle 15 and the fluidised bed 3. The material passes into a pipe 18 where the larger particles are ground through a rasp 19 (having holes of a predetermined size) by the action of a rotable milling piece 20 which rotates as shown by the arrow forcing the larger particles through the rasp 19. Milling piece 20 is rotated by motor $M_2$.

The fluidised material passes onto perforated baffles 21 where the particles of a size that is predetermined as too small (for example less than 300 microns) are continuously returned to chamber 1 via pipe 22 containing air flow control vent 23 by a stream of air flowing countercurrent to the fall of the material and being of such a force to blow the particles of too small a size into pipe 22. The dust removing stream of air is introduced via inlet 24 (in the direction of arrows 25) below perforated baffles 21 and the introduction of air is controlled by vent 26.

The remainder of the fluidised material passes to a rotable sluice 27 having compartments 28 for receiving the fluidised material. Pipe 30 connects container 29 with the area below the baffles 21. Because of the presence of the sluice 27 pipe 30 is never open directly to container 29.

Figure 2:
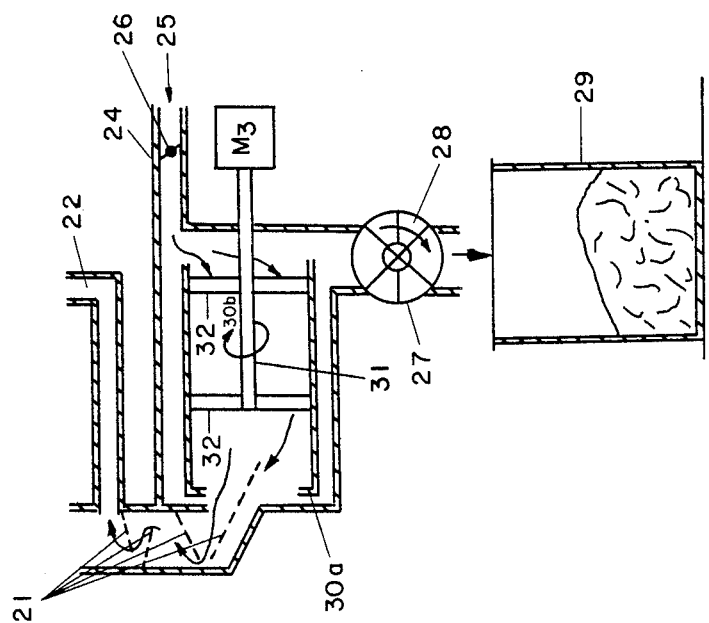

FIG. 2 shows a modification of a part of FIG. 1 for removing particles that are too small and polishing (grinding off) the particles. The material from the fluidised bed (not shown) passes to perforated baffles 21. Air for removing dust is introduced from inlet pipe 24 in countercurrent to the fall of particles at such a pressure that the particles that are too small are blown into pipe 22 through which they are returned to the fluidised bed. The remaining material passes through the perforated baffles 21 to a rotatable chamber 30a (rotatable in a direction as shown by arrow 30b) around an axially extending member 31 that is rotated by motor $M_3$. Cross positioned members 32 connect chamber 30a to member 31 and are so designed to allow air from inlet pipe 24 to flow through the chamber 30a axially to pipe 22. Material from chamber 30a is then transferred to sluice 27 and then to container 29.

Figure 3:
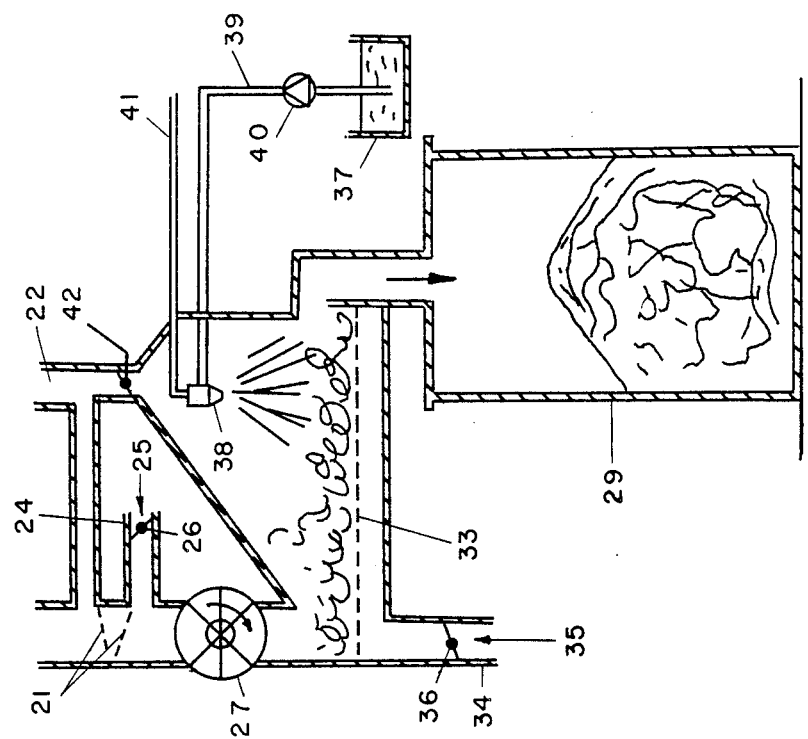
FIGS. 2 and 3 show alternative modifications to the apparatus of FIG. 1.

FIG. 3 shows a further modification to the apparatus of FIG. 1 in which a further fluidising bed is positioned between sluice 27 and container 29. The fluidised material falls on a perforated floor 33 through which an air stream flows from inlet 34 in the direction of arrow 35 and is controlled by vent 36. A spray of liquid (preferably the sodium salt of dinaphthyl methane disulphonic acid in aqueous form) from reservoir 37 is introduced to nozzle 38 via pipe 39 controlled by a pump 40. Air is introduced to nozzle 38 via inlet pipe 41. The spray introduced by nozzle 38 is to dampen the fluidised material and the introduction of air via inlet 34 is to ensure an even distribution of particles being contacted by the spray in the fluidised bed. Vent 42 regulates the flow of air from inlet pipe 34 to pipe 22 connected to the chamber of the fluidised bed apparatus. The dampened fluidised material is removed from sieve 33 to container 29.

Figures 4, 5:
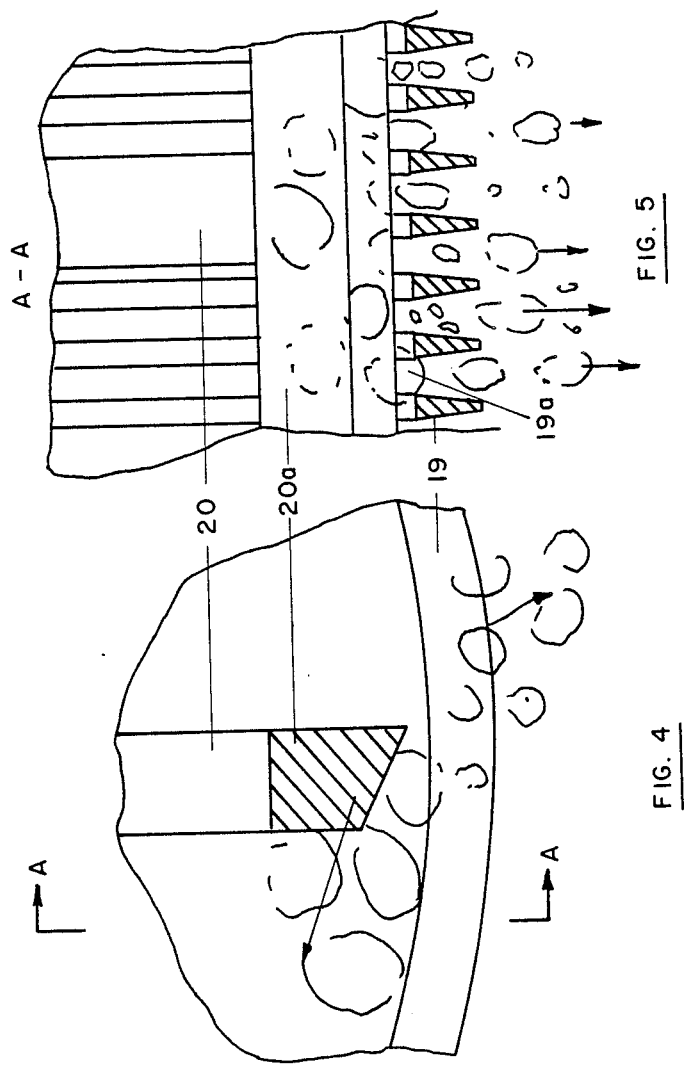
FIGS. 4 and 5 are enlarged view of parts of FIG. 1.

FIG. 4 shows an enlarged view of rasp 19 and milling part 20 of the apparatus of FIG. 1 and FIG. 5 is a sectional view along A—A of FIG. 4. The cutting edge 20a of milling part 20 contacts the particles of fluidised material that are too large to pass through rasp holes 19a and forces the particles through holes 19a thereby reducing the size of the particles.

EXAMPLE

Eight reactive dyestuff solutions were made up as given in the Table below (four solutions of C.I. Reactive Orange 93 and four solutions of C.I. Reactive Violet 36)

TABLE

| Solution 1 | Solution 2 | Solution 3 | Solution 4 | |
|---|---|---|---|---|
| 30% | 25% | 25% | 22% | pure dyestuff |
| 10% | 15% | 10% | 8% | Glauber salt |
| 0% | 0% | 5% | 10% | the sodium salt of dinaphthyl methane disulphonic acid |
| 60% | 60% | 60% | 60% | Water |

The solutions are each fluidised separately in the apparatus of FIG. 1 including the modification shown in FIG. 2 and each gives a granulate which is practically dust-free and easily soluble in water. 95% of the particles have a size greater than 0.8 mm and 5% have a size greater than 2.0 mm, the average size of the particles being 1.3 mm.

The size of holes in the rasp 19 is 0.8 mm.

The rate of introduction of the dyestuff solutions is 300 liters/hour. The screw shaft is rotated at 10-200 rpm (preferably 100 rpm); the milling piece is rotated at 50-80 rpm (preferably 75 rpm). The rate of air flow through the perforated floor (4) is 5-10 thousand $m^3$/hour and the rate of flow through pipe 22 is 50-500 $m^3$/hour.

The fluidised bed granulator perforated floor (4) has a surface area of 0.75 $m^2$ and produces 110 kg of granulate per hour. The temperature of the fluidising air is 137° C. and of the air when expelled (via outlet 11) is 59° C.

The resulting product has 5% of particles less than 0.46 mm and 0.5% of the particles are greater than 0.75 mm the average size of the particles being 0.6 mm.

In a similar fashion granules of acid dyestuff C.I. Acid 57 can be prepared from a solution of 30% pure dyestuff and 70% water. The rate of granulate production is 85 kg per hour (using 0.75 $m^2$ perforated floor) with the fluidising air being introduced at a temperature of 115° C. and being expelled at 58° C. The granular material is practically dust-free and easily soluble in water.

In a similar fashion a benzotriazole granulate may be prepared from a solution of 70% benzotriazole (often used as a rust inhibitor) and 30% water. The rate of granulate production is 150 kg per hour, the temperature of the fluidising air is 115° C. and the temperature of the air when expelled is 58° C. The granular material is practically dust-free and easily soluble in water.

What is claimed is:

1. A process for preparing a granular product having particles of a size substantially within the range from a first predetermined larger size to a second predetermined smaller size comprising the steps of (1) introducing the material to be granulated in the form of spray of a solution or dispersion to a fluidized bed drier, (2) removing solid particles formed in the fluidized bed from the fluidized bed, (3) passing all of the removed particles through means whereby all the removed particles larger than said first predetermined size are reduced in size and (4) contacting the particles after passing through the size reducing means and while falling therefrom with air flowing countercurrent to the fall of the particles at such a force as to cause substantially only the particles smaller than said second predetermined size to move in a direction opposite to their fall and to be returned to the fluidized bed drier.

2. A process according the claim 1 which comprises the further step (5) of wetting with wetting material in a further fluidized bed the granular product from which the particles smaller than said second predetermined size have been separated.

3. A process according to claim 1 which comprises the further step of recovering the granular product from which the particles smaller than the second predetermined size have been separated.

4. A process according to claim 1 wherein step (3) comprises milling the particles through holes in a rasp.

5. A process according to claim 1 which further comprises, following step (3), contacting the particles with perforated baffles to facilitate separation of the particles smaller than said second predetermined size.

6. A process according to claim 2 wherein the wetting material is sulphonated castor oil or the sodium salt of dinaphthyl methane disulphonic acid in aqueous solution.

7. A process according to claim 2 wherein the amount of wetting material is such that the wetted granular product contains 0.5 to 10% wetting material.

8. A process according to claim 2 which comprises the further step of recovering the wetted granular product.

9. A process according to claim 3 which is carried out in a continuous manner.

10. A process according to claim 3 in which the particles removed from the fluidized bed prior to step (3) are at least greater in size than 2 to 5 times the second predetermined size.

11. A process according to claim 5 which comprises the further step of recovering the granular product from which the particles smaller than the second predetermined size have been separated.

12. A process according to claim 5 which comprises the further step (5) of wetting with wetting material in a further fluidized bed the granular product from which the particles smaller than said second predetermined size have been separated.

13. A process according to claim 12 which comprises the further step of recovering the wetted granular product.

14. A process according to claim 5 wherein the particles removed from the fluidized bed prior to step (3) are at least greater in size than 2 to 5 times the second predetermined size.

15. A process according to claim 12 wherein the particles removed from the fluidized bed prior to step (3) are at least greater in size than 2 to 5 times the second predetermined size.

16. A process according to claim 13 wherein the particles removed from the fluidized bed prior to step (3) are at least greater in size than 2 to 5 times the second predetermined size.

17. A process according to claim 13 wherein the amount of wetting material is such that the wetted granular product contains 0.5 to 10% wetting material.

18. A process according to claim 16 wherein the amount of wetting material is such that the wetted granular product contains 0.5 to 10% wetting material.

19. A process according to claim 18 wherein the recovered product has an average particle size of 0.2 to 1 mm.

* * * * *